(12) United States Patent
Amar et al.

(10) Patent No.: US 8,671,112 B2
(45) Date of Patent: Mar. 11, 2014

(54) METHODS AND APPARATUS FOR AUTOMATED IMAGE CLASSIFICATION

(75) Inventors: Anshul Amar, Los Angeles, CA (US); JoRel Sallaska Nye, Watertown, MA (US)

(73) Assignee: athenahealth, Inc., Watertown, MA (US)

( * ) Notice: Subject to any disclaimer, the term of this patent is extended or adjusted under 35 U.S.C. 154(b) by 658 days.

(21) Appl. No.: 12/138,181

(22) Filed: Jun. 12, 2008

(65) Prior Publication Data

US 2009/0313194 A1 Dec. 17, 2009

(51) Int. Cl.
*G06F 17/30* (2006.01)
(52) U.S. Cl.
USPC .......................................................... 707/780
(58) Field of Classification Search
None
See application file for complete search history.

(56) References Cited

U.S. PATENT DOCUMENTS

| | | | | |
|---|---|---|---|---|
| 6,424,997 B1 * | 7/2002 | Buskirk et al. | ................. | 709/206 |
| 6,606,620 B1 * | 8/2003 | Sundaresan et al. | ................... | 1/1 |
| 7,227,985 B2 * | 6/2007 | Ikeda et al. | .................... | 382/159 |
| 7,765,178 B1 * | 7/2010 | Roizen et al. | .......................... | 1/1 |
| 2003/0046297 A1 * | 3/2003 | Mason | .......................... | 707/102 |
| 2005/0027568 A1 * | 2/2005 | Dorris | ............................... | 705/3 |
| 2005/0060643 A1 * | 3/2005 | Glass et al. | ................. | 715/501.1 |
| 2005/0086224 A1 * | 4/2005 | Franciosa et al. | .................. | 707/6 |
| 2005/0134935 A1 * | 6/2005 | Schmidtler et al. | ........... | 358/448 |
| 2005/0165819 A1 * | 7/2005 | Kudoh et al. | ................. | 707/101 |
| 2005/0226516 A1 * | 10/2005 | Kimura et al. | ................ | 382/243 |
| 2005/0246333 A1 * | 11/2005 | Hou et al. | .......................... | 707/5 |
| 2005/0275871 A1 * | 12/2005 | Baird et al. | .................. | 358/1.15 |
| 2006/0069678 A1 * | 3/2006 | Chou et al. | ......................... | 707/5 |
| 2006/0190489 A1 * | 8/2006 | Vohariwatt et al. | ......... | 707/104.1 |
| 2006/0212413 A1 * | 9/2006 | Rujan et al. | ...................... | 706/20 |
| 2007/0067293 A1 * | 3/2007 | Yu | ...................................... | 707/7 |
| 2007/0153322 A1 * | 7/2007 | Howard | ....................... | 358/1.15 |
| 2008/0147400 A1 * | 6/2008 | Yu et al. | ......................... | 704/251 |
| 2008/0260253 A1 * | 10/2008 | Miyazaki | ....................... | 382/190 |
| 2008/0273220 A1 * | 11/2008 | Couchman | .................... | 358/1.15 |
| 2009/0116756 A1 * | 5/2009 | Neogi et al. | ................... | 382/224 |
| 2009/0150308 A1 * | 6/2009 | Wang et al. | ....................... | 706/12 |
| 2009/0157720 A1 * | 6/2009 | Kolcz et al. | .................... | 707/102 |
| 2009/0192979 A1 * | 7/2009 | Lunde | ............................... | 707/1 |
| 2010/0138451 A1 * | 6/2010 | Henkin et al. | ................. | 707/803 |
| 2011/0032578 A1 * | 2/2011 | Couchman et al. | ............ | 358/400 |

OTHER PUBLICATIONS

"Exploiting Structural Information for Text Classification on he WWW", Furnkranz et al., 487-497, 1999, http://clair.si.umich.edu/~radev/767w10/papers/Week09/pradeep/1.pdf.*

"Text Classification Using Machine Learning Techniques", M. Ikonomakis et al. Aug. 2005, pp. 966-974,citeseerx.ist.psu.edu/viewdoc/download?doi=10.1.1.95.9153&rep . . . .*

"Clustering Based Algorithm for Automatic Document Seperation", Kevyn Collins Thomas et al., http://citeseerx.ist.psu.edu/viewdoc/download?doi=10.1.1.20.4358&rep=rep1&type=pdf.*

* cited by examiner

*Primary Examiner* — Neveen Abel Jalil
*Assistant Examiner* — Kellye Buckingham
(74) *Attorney, Agent, or Firm* — Wolf, Greenfield & Sacks, P.C.

(57) ABSTRACT

A system for automated classification of an image of an electronic document such as a facsimile document. The image is converted to a textual representation, and at least some of the terms in the textual representation may be associated with one or more predefined classification types, thereby enabling the document to be classified, and for multi-page documents, determining boundaries used to split the document into sections. The development of associations between terms and classification types may result from providing, to the system, a training set of manually-classified documents. A training module analyzes the training set to calculate probabilities that particular terms may appear in documents of a particular classification type. Probabilities established during training are used during automated document processing to assign a classification type to the document. A confidence score associated with the assigned classification type provides a metric for assessing the accuracy of the automated process.

16 Claims, 11 Drawing Sheets

400

420

CLASSIFICATION TYPE

410

TERM IN VOCABULARY

| | CLASS X | CLASS Y | CLASS Z |
|---|---|---|---|
| TERM A | COUNT A,X | | COUNT A,Z |
| TERM B | | | |
| TERM C | COUNT C,X | | COUNT C,Z |

METHODS AND APPARATUS FOR AUTOMATED IMAGE CLASSIFICATION

TECHNICAL FIELD

The present invention relates generally to the processing of electronic images, and more specifically relates to the automated classification of facsimile documents.

BACKGROUND

With the advent of electronic medical records (EMRs) and electronic medical billing, many healthcare providers have adopted procedures to enter most (or all) incoming information into one or more computer databases so that the information may be readily accessible to doctors, nurses, or other clinical staff who require it. The increased accessibility of patients' medical information afforded by EMRs is just one of several factors which provide improvements over more conventional paper-based data management systems. For example, provided such data is accompanied by appropriate security measures, data stored in EMRs, may be more conveniently copied to another location for backup purposes, and EMRs may be more easily transferred from one hospital or clinic to another than traditional paper-based medical files. Yet another potential advantage of EMRs is the ability to store large quantities of data from a variety sources, including laboratory results, imaging results, medical histories, etc. in a cohesive manner.

SUMMARY

Some embodiments of the present invention are directed to a method of processing an electronic document image. The method comprises converting the image to a textual representation, assigning to the electronic document image, a document classification based, at least in part, on at least one term identified in the textual representation, the document classification having an associated confidence score, and determining that the electronic document image was accurately classified if the confidence score exceeds a predetermined threshold value.

Some embodiments are directed to a method of classifying an image of an electronic document. The method comprises generating, from the image, a data structure comprising at least one term appearing in the image, calculating a term frequency for the at least one term, calculating at least one classification probability for the document, the at least one classification probability comprising a first probability computed based, at least in part, on the term frequency and at least one first factor, and a second probability computed based, at least in part, on the term frequency and at least one second factor, selecting a classification based, at least in part, on the first probability and the second probability, and assigning the classification to the document.

Some embodiments are directed to a computer-readable medium, encoded with a series of instructions, that when executed on a computer, perform a method of classifying an electronic document image according to a plurality of classification types. The method comprises, parsing the electronic document image to identify at least one term in the electronic document image, determining at least one probability that the at least one term is associated with at least one of the plurality of classification types, and assigning a classification to the electronic document image based on the at least one probability.

Some embodiments are directed to a method of extracting identifying information from an electronic image. The method comprises locating in the electronic image, at least one trigger term, selecting an identifying term located proximate to the at least one trigger term in the image, searching a data structure for an entry comprising the identifying term, assigning at least a portion of data in the entry as the identifying information, and outputting an indication of the identifying information.

Some embodiments are directed to an apparatus for automated classification of an electronic document image. The apparatus comprises a training module for processing at least one training document, at least one data structure generated by the training module, and a processing module for processing the electronic document image. The processing module may be configured to generate at least one classification for the document image based, at least in part, on information in the document image and at least some information in the at least one data structure.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF DRAWINGS

The accompanying drawings are not intended to be drawn to scale. In the drawings, each identical or nearly identical component that is illustrated in various figures is represented by a like reference character. For purposes of clarity, not every component may be labeled in every drawing. In the drawings:

FIG. 4 is a representation of a data structure for use with various embodiments of the invention;

DETAILED DESCRIPTION

Figure 1:
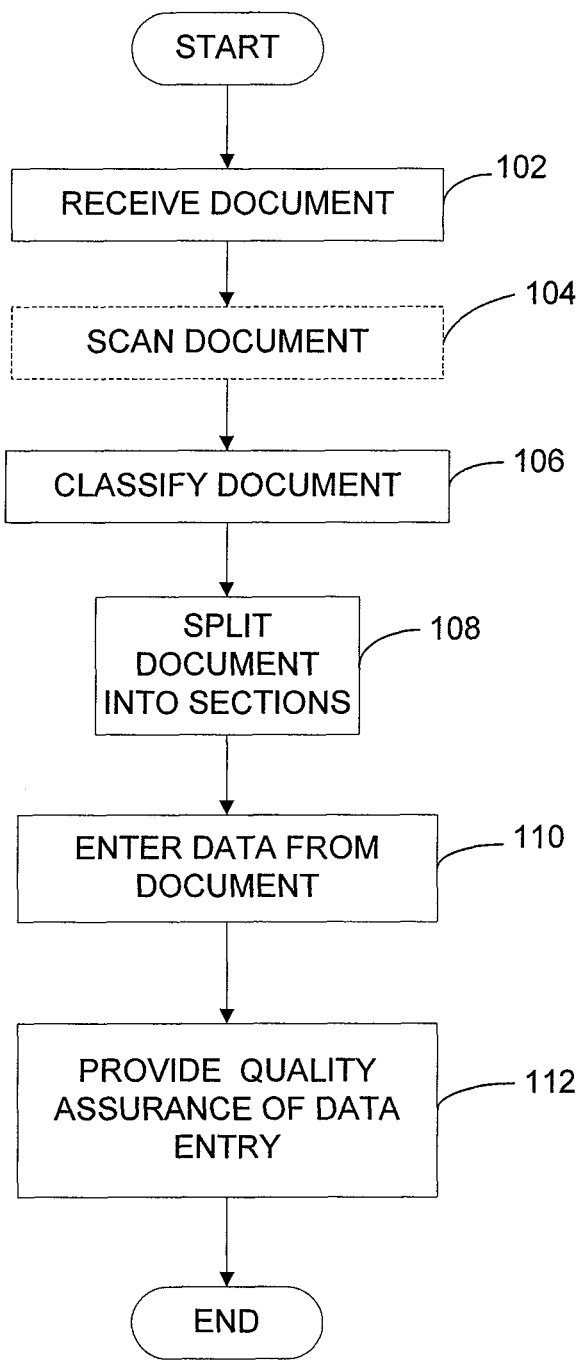
FIG. 1 is flow diagram of a document processing method according to some embodiments of the invention.

The present disclosure generally relates to inventive methods and apparatus for processing electronic images, and more specifically to image classification of facsimile (i.e., faxed) documents. While the deployment of systems for the management of electronic medical records and medical billing has increased dramatically over the past decade, much of the information that should be included as part of the electronic record is often received using conventional paper-based means such as via the mail or facsimile. Accurate routing of incoming paper documents often requires that each document be manually classified and sent to appropriate data entry personnel for entry of the data into an electronic database.

Applicants have recognized and appreciated that existing methods of document classification may be unsuitable when the number of documents to be classified is large. Thus, some embodiments of the present invention are directed to methods and apparatus for high-throughput automated classification of electronic documents.

Various types of service provider entities, including, but not limited to, healthcare providers, insurance agencies, and mortgage brokers, may receive large quantities of faxed documents over the course of hours, days, or weeks. In some instances, document classification may not be a complex task, if the incoming documents may be categorized into one of only a few categories. However, in other instances, the number of categories and/or sheer volume of incoming documents may be overwhelming, and mere classification of the documents may become a complex and time consuming process. For the purposes of the present disclosure, embodiments will be described with application to healthcare providers such as doctor's offices, hospitals, and clinics, although, it should be readily appreciated that the methods and apparatus described herein may be used in any of a variety of settings, including, but not limited to the examples provided above.

Healthcare providers may receive hundreds of faxes a day related to various aspects of their medical practice. For example, a medical clinic may receive laboratory results, patient referral forms, prescription information, medical billing information, advertisements, etc. Each received fax must be classified to determine where the fax should be directed. Typically such document classification is performed by one or more humans who examine each document and assign it a classification based on information found in the document. If the number of incoming faxed documents begins to exceed the workload capacity of the medical clinic staff assigned to classify faxes, more staff members may need to be assigned to classify faxes, leading to a loss of productivity for these additional staff, and ultimately, a loss of revenue for the healthcare provider.

Rapid classification of incoming fax documents may also be critical so that important documents may not be misplaced or otherwise buried in a large stack of incoming documents. For example, a doctor at a clinic may be waiting to review laboratory results for a patient to determine if the patient's medication dose should be adjusted. The laboratory results for the patient may be faxed from the laboratory facility to the clinic. In a best case scenario, a human may be monitoring incoming faxes and may classify the faxed document as a laboratory result. The human may accordingly send the fax to data entry personnel to enter the laboratory data into a electronic database that is accessible to the doctor. In a worst case scenario, the fax containing the laboratory results may be placed in a stack of hundreds of other incoming faxes for the day, and the laboratory results may not be entered into the corresponding electronic database for quite some time, or, if the document is inadvertently lost, the results may not be entered at all.

To address at least some of these difficulties associated with the manual processing of documents, some embodiments are directed to methods and apparatus for automated processing of such documents. An exemplary illustration of a method for processing incoming fax documents is provided in FIG. 1. In step 102, an incoming fax document may be received, and the document may optionally be scanned into an electronic file in step 104. The document may be classified as belonging to one of a number of predetermined categories in step 106. The classification may be performed manually by, for example, a human looking for keywords in the document. Alternatively, in cases where the document is converted to an electronic form (e.g., by scanning or otherwise), various classification algorithms may be employed to auto-classify the document. Some or all of these classification algorithms may be used in combination with one or more optical character recognition (OCR) software programs, which are designed to convert an electronic image to a textual representation.

Figure 2:
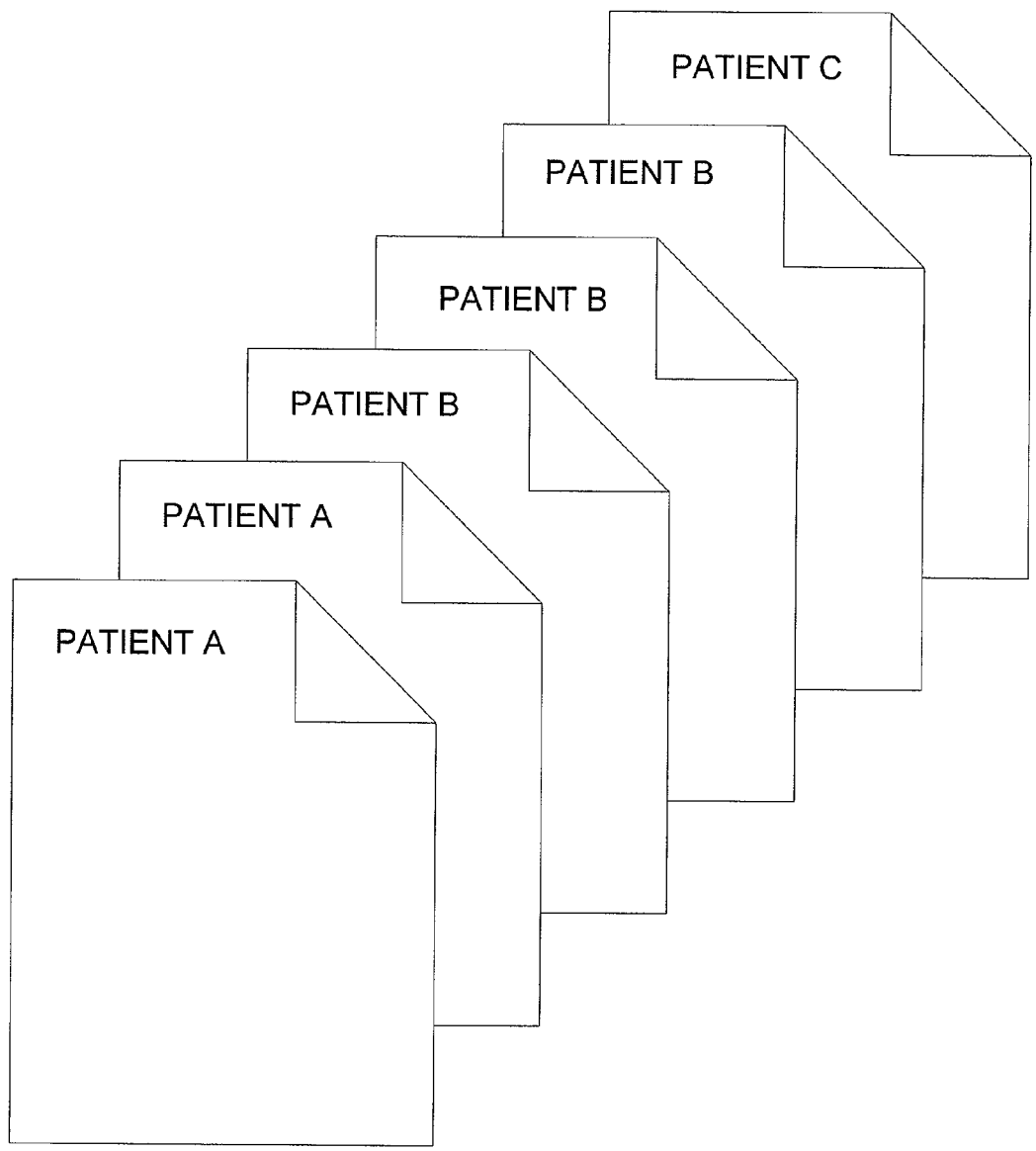
FIG. 2 is a schematic of a multi-page document for use with some embodiments of the invention.

Some incoming documents may comprise multiple pages which may be directed to different sources of data. For example, a laboratory report transmitted to a clinic from a lab may contain laboratory results for several patients as illustrated in FIG. 2. In the example of FIG. 2, a fax transmission may contain six pages, with the first three pages comprising laboratory results for patient A, the next three pages comprising laboratory results for patient B, and the last page comprising laboratory results for patient C. In some embodiments, it may be desirable to locate the boundaries between different independent sections of a fax transmission, and to split the original document into the multiple sections in step 108. Splitting a document into sections may be particularly helpful if, for example, the original document comprises a large number of sections. By splitting the document into sections, data from each of the sections may be entered into an electronic database in parallel, resulting in a more rapid entry of the data into the database. Exemplary methods for splitting a document into sections in accordance with some embodiments are provided in more detail below.

Following document classification and splitting of the document into multiple sections, data for each section may be entered into an electronic database in step 110. In some implementations, at least some of the data may be automatically entered into the database by use of a keyword searching algorithm, or the like, and embodiments are not limited in this respect. To improve the data entry accuracy, the same data may be entered multiple times by different data entry personnel, and the duplicative data entries may be checked for consistency. An additional layer of data entry assessment may be provided by quality assurance monitoring personnel who may check the accuracy of the entered data in step 112, thereby enabling the processing of the document to commence.

According to embodiments of the present invention, at least some document processing steps, such as, for example, document classification step 106 and document splitting step 108, which are usually performed manually, may be modified to use an automated procedure. As detailed above, in conventional document classification methods, human operators may classify incoming fax documents based on predetermined categories. Such manual classification may affect the priority by which the documents are processed by the recipients or end users, who will process the documents, and how the documents may be filed for easy retrieval. For example, incoming fax documents to a doctor's office, may be categorized by human operators using classification categories such as "Prescription Renewal" or "Lab Result."

As an alternative to manual classification, according to some embodiments, an automated system may employ one or more algorithms to derive the probability that an incoming fax document should be classified as a particular type. In some embodiments, the automated system may be configured to produce results that approximate the behavior of human operators. In such embodiments, the automated system 300 may comprise a training module and a processing module, as illustrated in FIG. 3A, and the operating system may operate in either a training mode or a processing mode.

In some embodiments, incoming documents 302 may be classified as belonging to a training set 304 or a processing set 306. Incoming documents 302 may be electronic images of faxed documents, email attachments, mail that has been scanned to produce an electronic image of a document, or any other type of electronic document image. Some incoming documents may be classified as belonging to both a training set and a processing set, in which case the document image may be used in both training mode and processing mode. A training module 310 may be configured to analyze the training set 304, which may be comprised of images of incoming documents collected over a period of time. Each document image in the training set 304 may have previously been split and classified into meaningful "document" units by a human operator. For example, in a twenty page fax document, a human operator may have labeled the first five pages as having a classification X and the next fifteen pages as having a classification Y. A large training set, such as a set including hundreds of document images collected and classified over several days or weeks, may be used to form an initial training model. After an initial training model has been formed, subsequent training sets may comprise fewer document images, and the automated system 300 may repeat training with a new training set 304, at more frequent intervals, for example, once per day.

According to some embodiments, training of automated system 300 with training module 310 may be used to generate or update at least one dictionary 312 based on the documents provided in the training set 304. As shown in FIG. 3B, training module 310 may further comprise a splitting module 314, a vocabulary module 316, and an indexing module 318. Each of these modules within training module 310 may interact with at least one classification algorithm 322 to produce the at least one dictionary 312. For example, splitting module 314 may produce splitting dictionary 324, vocabulary module 316 may produce vocabulary dictionary 326, and indexing module 318 may produce indexing dictionary 328. While three types of classification modules have been shown in FIG. 3B, it should be appreciated that any number of classification modules may be used, and embodiments of the invention are not limited in this respect.

In some embodiments, at least one dictionary 312 may be a data structure similar to that shown in FIG. 4 at 400, which may correspond to a data structure in an underlying computer-readable medium not shown. Such computer implemented data structures may be implemented in any suitable form, such as, but not limited to, a relational database, linked lists, arrays, matrices, a flat file database, and so forth.

In some embodiments, data structure 400 may comprise a table having columns arranged along a first axis and rows arranged along a second axis, the intersection of a column and a row defining a cell. In a vocabulary dictionary, where terms in a page are mapped to predefined document classification types, each row 410 of data structure 400 may represent a term in the vocabulary, and each column 420 may represent a different document classification type. The value in each cell of data structure 400 may be a word count value for a corresponding term and document classification type. Some terms, for example, the term "pharmacy," may appear frequently in documents having certain classification types (e.g., "Prescription Renewal") but may appear less frequently in documents having other classification types (e.g., "Lab Results"), and this information may adequately be captured using data structure 400 and methods described in more detail below.

Figure 5:
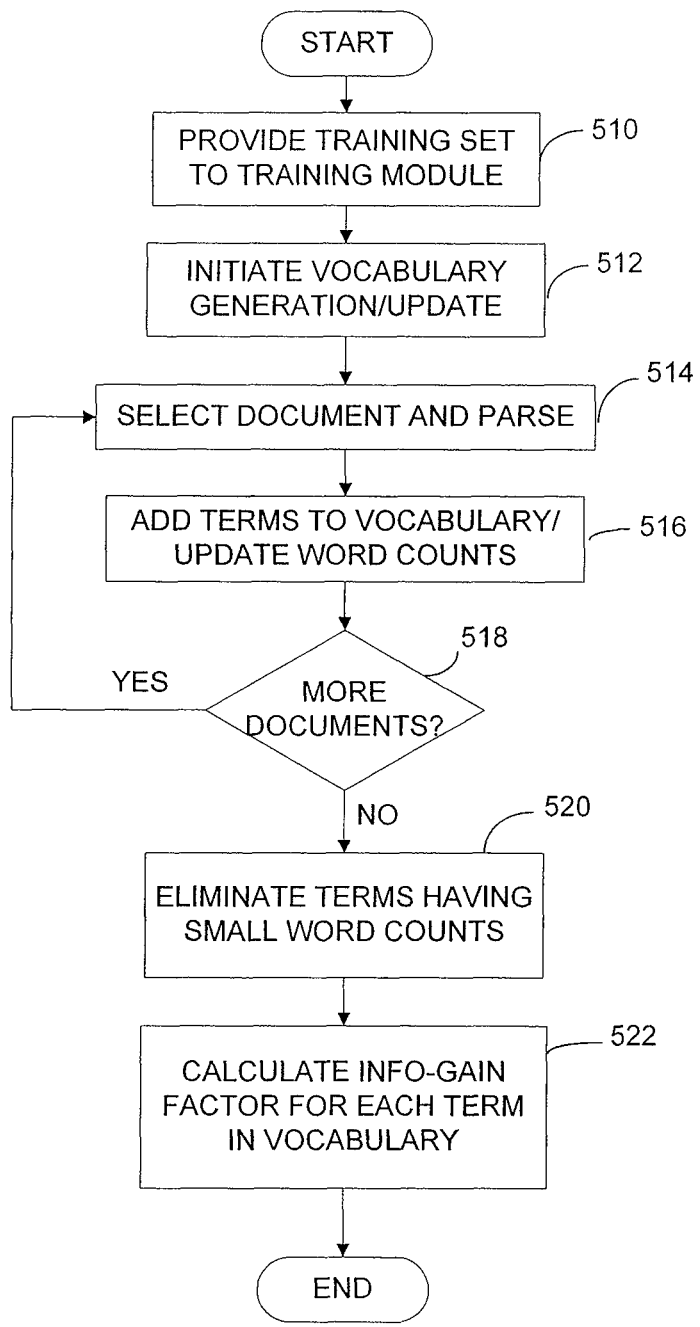
FIG. 5 is a flow diagram of a process for populating a data structure during training of an automated system in accordance with some embodiments of the invention.

In some embodiments, a vocabulary module 316 may be configured to generate a vocabulary dictionary 326 according to a classification process illustrated in FIG. 5. In a step 510, a training set may be provided to the training module. The training set may comprise any number of document images, with each page in a document image having a manually-assigned document classification type. In step 512, the generation/updating of the vocabulary dictionary by using the provided training set may be initiated. In step 514, a first document in the training set may be selected, and the terms (i.e., words) in the document image may be parsed using any suitable method. For example, an optical character recognition (OCR) module may be implemented as part of training module 310 to transform the document image into a textual representation. Any suitable OCR algorithm may be used, and embodiments of the invention are not limited in this respect.

Terms identified in the textual representation of the document image may be added to the vocabulary dictionary in step 516. Some terms may be new to the vocabulary dictionary, whereas other terms may have already been encountered. If a new term is encountered, it may be added to the vocabulary dictionary and may be assigned a word count of one. For example, using the illustrative example of FIG. 4, the first column of data structure 400 may comprise the names of all terms in the vocabulary dictionary. This column may be searched for a term, and if the term is not found, a new row may be added to data structure 400, and the appropriate word count value may be set to one depending on the manually-assigned classification type for the document image currently being processed. In some embodiments, the word count value for all document classification types other than the current document classification type may be set to zero when a new term is added to the vocabulary dictionary. If a term is encountered that already exists in the vocabulary dictionary (e.g., already exists as a row in data structure 400), the corresponding word count value for the term and document classification type may be incremented by one.

After processing all terms in a document, it may be determined in step 518 if there are remaining unprocessed documents in the training set. If there are additional documents, a new document may be selected from the training set and the selected document may be parsed in step 514. If all documents in the training set have been processed, the vocabulary dictionary may be consolidated by eliminating terms in the vocabulary dictionary having small word count values in step 420. For example, in one embodiment, all terms having a word count of zero or one across all classification types may be eliminated from the vocabulary dictionary.

For each term in the consolidated vocabulary dictionary, an "info-gain" factor may be computed in step 522 for each classification type. An info-gain factor may be related to a term's importance and evidentiary value towards each classification type. In some embodiments, an info-gain factor may be computed using a term-frequency, inverse document frequency (TF-IDF) formula as follows:

info-gain=evidence/(likelihood*inverse document frequency), where evidence is the ratio of all documents of a given classification type that contain the term, likelihood is the ratio of all documents (i.e., regardless of classification type) which contain the term, and inverse document frequency is the ratio of the number of times a word appears in a document divided by the logarithm of the total number of times the term appears in the entire training set.

In some embodiments, the info-gain factors calculated for each term and type may be determined using the word count values stored in data structure 400, or using data stored in any additional data structures which may be necessary for calculating the info-gain factors. Although some embodiments may use the TD-IDF method to calculate info-gain factors, other embodiments may use other classification methods to calculated info-gain factors, including, but not limited to, Naïve Bayesian Classification.

The calculated info-gain factors for each term and document classification type may be stored in data structure 400 in any suitable manner. Alternatively, info-gain factors may be stored in a separate data structure, and embodiments of the invention are not limited in this respect.

In some embodiments, initial training sets administered to automated system 300 should be sufficiently large to ensure that the calculated info-gain factors for at least some of the classification types are sufficiently large. Since info-gain factors measure the degree of correspondence between a term and a classification type, terms with large info-gain factors for a particular classification type may be considered as very frequently occurring "keywords" that may be associated with the classification type. With reference, to an example provided above, the term "pharmacy" may be highly correlated with the classification "Prescription Refill," but very negatively correlated with the classification type "Lab Results." In some embodiments, a "term" in a document image may refer to a single word, or alternatively to a multi-word phrase, and embodiments of the invention are not limited in this respect.

In some embodiments, a method similar to the method shown in FIG. 5 for generating/updating a vocabulary dictionary 326, may be used to generate/update a splitting dictionary 324, which may be used to split a multi-page document into sections. In some implementations, splitting a multi-page document into sections may comprise identifying boundary points between sections that represent different patients, different classifications, or any other suitable splitting metric, such as boundaries identifying different individuals to which pages in a multi-page document are to be sent.

In some embodiments, training module 310 may additionally be configured to populate a data structure corresponding to a splitting dictionary 324 by using a splitting module 314 as shown in FIG. 3B, although in other embodiments, a separate training module for establishing splitting criteria may be used. In some embodiments, classification and splitting may be embodied as repeating the classification procedure described in FIG. 5 using at least two training passes. In a first pass, a training module 310 may use vocabulary module 316 to attempt to determine correspondence strengths (i.e., info-gains) between terms in a provided training set and classification types. In a second pass, using substantially similar classification algorithms 322 but with different parameters, the training module may use splitting module 214 to determine correspondence strengths between terms and human-classified boundary points for splitting a multi-page document.

Figure 6:
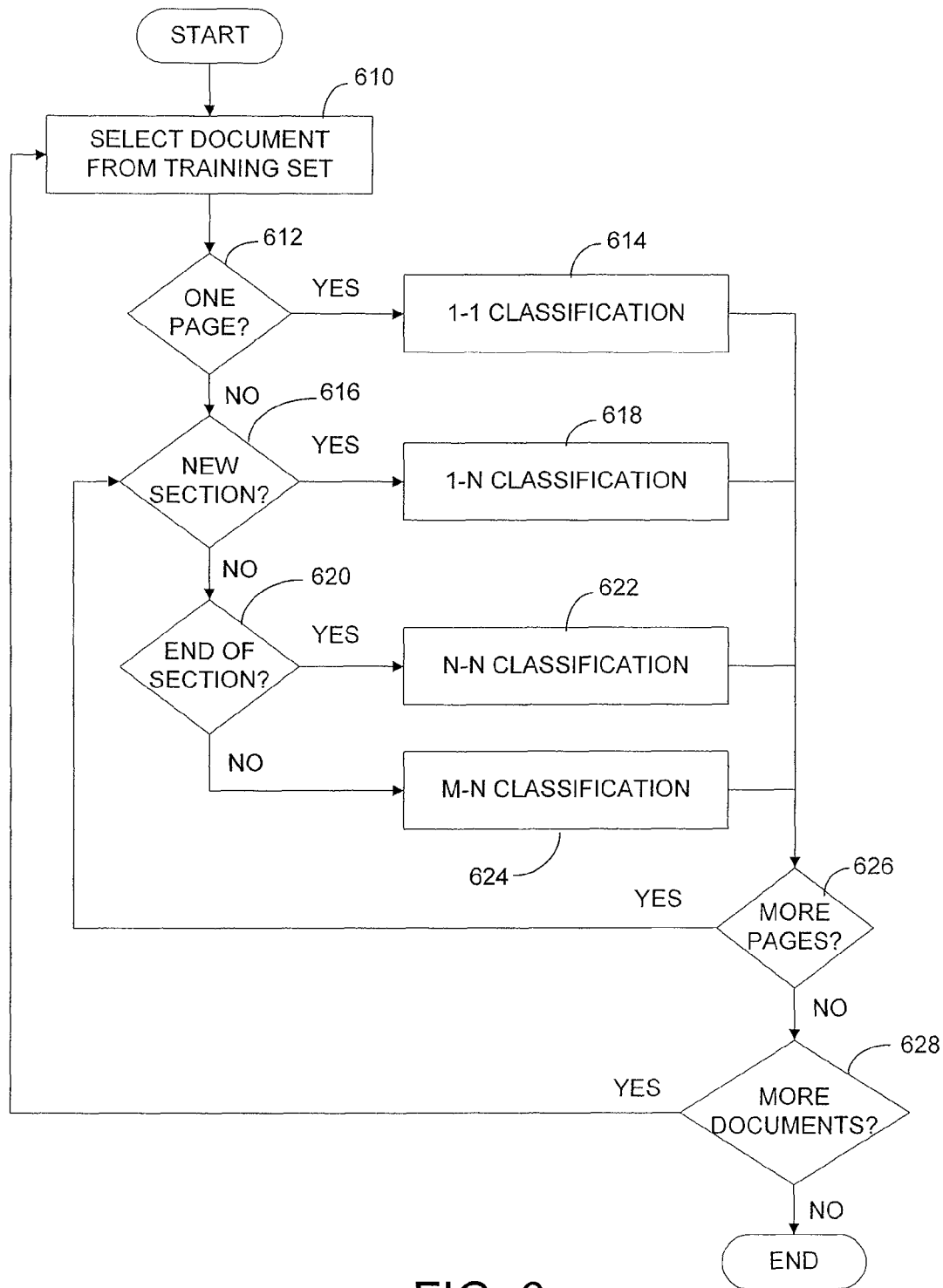
FIG. 6 is a flow diagram of a process for assigning page-splitting classifications according to some embodiments of the invention.

In some embodiments, a page-splitting classification system may be used to facilitate the generation of a splitting dictionary during training. As illustrated in FIG. 6, instead of document classification types used to generate a vocabulary dictionary 326, additional "virtual" types may be defined for training the automated system 300 on page-splitting criteria. According to some embodiments, four "virtual" classification types may be defined for page-splitting, and one of these four virtual classification types may be assigned to each page of a document using a process illustrated in FIG. 6. In step 610, a first document in a training set may be processed. In step 612, it may be determined if the document is a single-page document or a multi-page document. If it is a single page document, then the page may be classified as a 1-1 page in step 614. If it is determined that the document is a multi-page document, it may be determined in step 616 if the current page is the start of a new section (e.g., as classified by a human before training). If the current page does begin a new section, the page may be classified as a 1-n page in step 618. If the current page does not begin a new section, it may be determined in step 620 if the current page is the last page of a section (e.g., as classified by a human before training). If the current page is the last page of a section, then the page may be classified as a n-n page in step 622. If the current page is not the last page of a section, then the page may be classified as a m-n page in step 624. After a page of the document has been classified, it may be determined in step 626 if the document contains additional pages. If the document contains additional pages, processing may return to step 616, and document processing may continue until all pages of the document have been classified. If all pages of the document have been classified, it may be determined in step 628 if additional documents in the training set remain to be classified. If there are additional documents, processing may return to step 610, and the process may repeat until all pages of all documents in the training set have been assigned a classification.

A working example of the process illustrated in FIG. 6 may be described using the exemplary multi-page document illustrated in FIG. 2. Prior to inclusion into a training set, the document shown in FIG. 2 may have been classified by a human operator as a "Lab Results" document, and it may contain six pages, with the first three pages comprising laboratory results for patient A, the next three pages comprising laboratory results for patient B, and the last page comprising laboratory results for patient C.

In step 610, the document may be selected, and in step 612, it may be determined that the document is a multi-page document. In step 616, the first page of the document may be determined to begin a new section (i.e., the first page of "patient A"), and the page may be classified as a 1-n page in step 618. In step 626, it may be determined that there are additional pages, and processing may continue at step 616 with the second page of the document. In step 616, it may be determined that the second page does not begin a new section (i.e., the page is still part of "patient A" section), and in step 620 it may be determined that the second page is also not the last page in a section. Accordingly the second page of the document may be classified as a m-n page. In step 626, it may be determined that the document comprises additional pages, and the third page may be processed beginning at step 616. In step 616, it may be determined that the third page does not begin a new section, and in step 620, it may be determined that the third page is the last page of a section (i.e., the last page of section "patient A"). Accordingly, the third page may be classified as an n-n page in step 622. In step 626, it may be determined that the document contains additional pages, and page four of the document may be processed at step 616. In step 616, it may be determined that page four begins a new section (i.e., begins section "patient B"), and the fourth page may be classified as a 1-n page in step 618. In step 626, it may be determined that the document comprises additional pages, and the fifth page may be processed at step 616. In step 616, it may be determined that the fifth page is not the beginning of a new section, and in step 620, it may be determined that the fifth page is the last page in a section (i.e., the last page of section "patient B"), and the page may be classified as a n-n page. In step 626, it may be determined that there are additional pages in the document, and page six may be processed at step 616. In step 616, it may be determined that the sixth page begins a new section (i.e., begins section "patient C"), and the page may be classified as a 1-n page in step 618. In step 626, it may be determined that all pages in the document have been classified, and in step 628, it may be determined that no other documents are to be processed in the training set and the classification process may end. Thus, according to some embodiments, the pages in the multi-page document shown in FIG. 2 may be classified as follows: 1-n, m-n, n-n, 1-n, n-n, 1-n.

It should be appreciated that boundaries between sections may be readily determined using the aforementioned classification system, as the first page in a new section may always be classified as a 1-n page. While four virtual classification types have been used in the illustrative example of FIG. 6, it should be appreciated that any suitable number of classifications may be used, and embodiments are not limited by the examples provided herein.

In some embodiments, once pages of documents in a training set have been classified according to one of the four virtual classification types using the process illustrated in FIG. 6, a splitting dictionary may be created according to the classification method shown in FIG. 5. That is, strengths of associations (e.g., info-gain values) between terms on a page and each of the four virtual classification types may be determined according to the process illustrated in FIG. 5. The resulting data structure may be similar to data structure 400 and each cell in the data structure may comprise an info-gain value for a corresponding term and virtual classification type.

Figure 7:
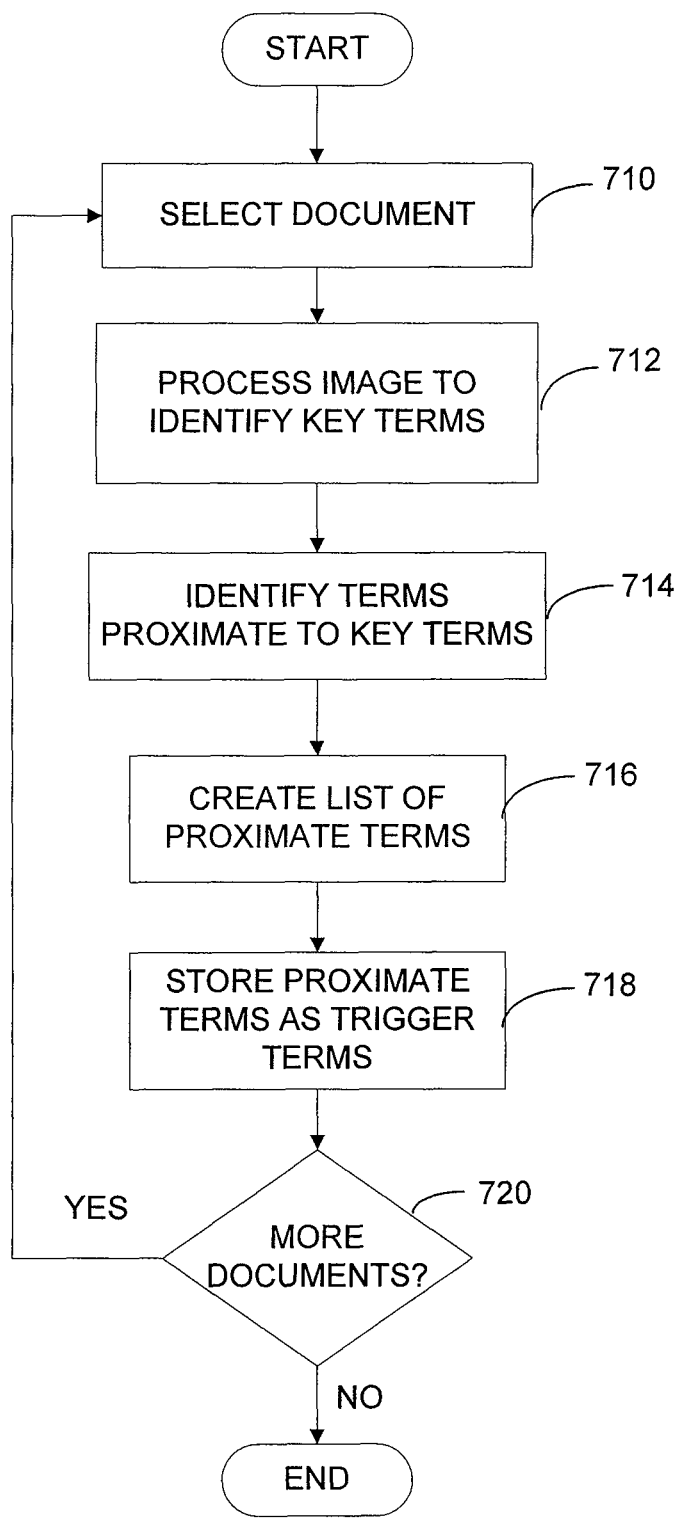
FIG. 7 is a flow diagram of a process for selecting trigger terms during training of an automated system in accordance with some embodiments of the invention.
Figure 8:
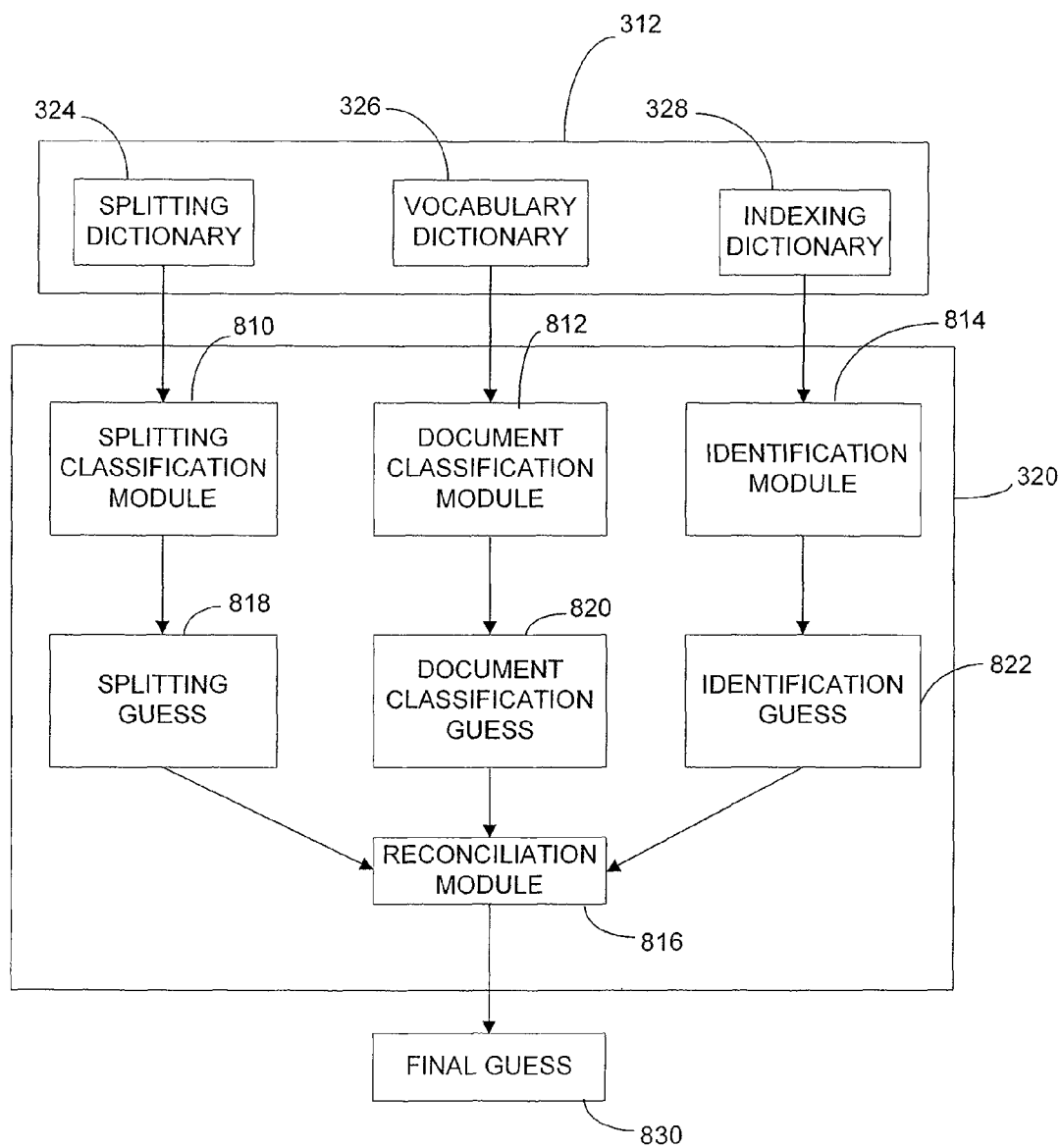
FIG. 8 is a diagram of a processing module for an automated system according to some embodiments of the invention.

In some embodiments, training module 310 may be additionally configured to generate an indexing dictionary 328 by using an indexing module 318 provided as part of training module 310 as shown in FIG. 3B. The indexing dictionary may comprise a plurality of "trigger" terms which may identify key information obtained from a document image. Such key information may be useful, for example, to associate pages of a document with a particular patient in a patient database. In some embodiments, the formation/updating of an indexing dictionary 328 may proceed according to a process illustrated in FIG. 7. In step 710, a document may be selected from a training set provided to the indexing module. In step 712, the selected document image may be processed using an OCR software program, or any other suitable method, to identify key terms (e.g., words or phrases) in the document, including, but not limited to, "Patient DOB," "Date of Birth," "Patient Name," or "SSN." Each of the identified key terms may be stored in a data structure, and terms located proximate to each of the identified key terms in the document may be detected in step 714. As used herein, "proximate" may refer to an object that is above, below, next to, adjacent to, or otherwise near to a referential object. In step 716, a list of the proximate terms may be created, and these proximate terms may be stored as trigger terms in an indexing dictionary in step 718. Trigger terms may indicate the likely presence of identifying information nearby, and thus may be used to search a document for corresponding identifying information. In step 720, it may be determined if additional documents in a training set remain to be processed. If there are additional documents, a new document may be selected in step 710, and the process may repeat until all documents in the training set have been processed. The resultant indexing dictionary may be a data structure comprising a list of trigger terms, that may subsequently be used to search for identifying information in documents.

Figure 3:
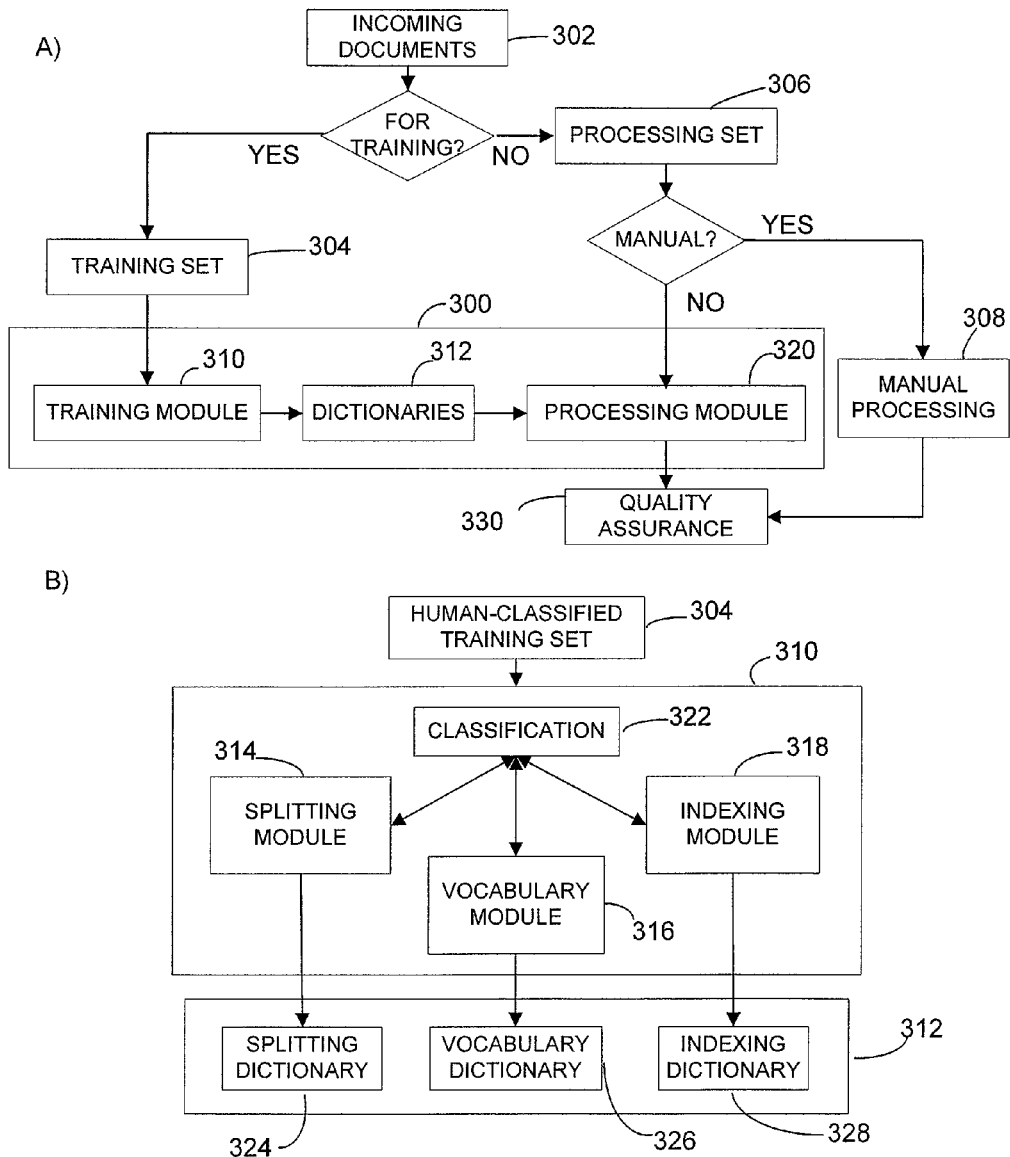
FIGS. 3A and 3B are respective diagrams of an document processing system and a training module according to some embodiments of the invention.

Some embodiments are directed to methods and apparatus for processing documents indicated as processing set 306 in FIG. 3. Some of the documents in processing set 306 may be classified using manual processing 308. For example, a human operator may manually classify and split at least some of the incoming documents 302 provided in processing set 306. Additionally, in some embodiments, at least some of the documents in processing set 306 may be processed automatically after at least some training has been completed. In such embodiments, processing module 320 may be configured to process incoming documents using information contained therein and at least some information stored in dictionaries 312. Referring to the processing flow of FIG. 1, in at least some embodiments, processing module 320 may be configured to automate, at least in part, classification (step 106), splitting (step 108), and at least some data entry (step 110) of document images provided to automated system 300.

Accordingly, processing module 320 may comprise a splitting classification module 810, for assigning to each page of a document, at least one splitting classification guess 818, a document classification module 812, for assigning to each page of a document, at least one document classification guess 820, and an identification module 814, for assigning to each page of a document, at least one identification guess 822. Each of the modules within processing module 320 may access corresponding dictionaries 312 generated/updated by training module 310. For example, splitting classification module 810 may access splitting dictionary 324, document classification module 812 may access vocabulary dictionary 326, and identification module 814 may access indexing dictionary 328.

The guesses 818, 820, and 822 produced by corresponding modules 810, 812, and 814 may comprise a set of guesses, ranked according to an associated confidence score, for each page of the document. The set of guesses from each of the modules 810, 812, and 814 may be combined to generate one or more scenarios that may vary in their consistency. In some embodiments, processing module 320 may further comprise a reconciliation module 816 which may generate the one or more scenarios from the sets of guesses and evaluate the consistency of the different scenarios. The output of reconciliation module 816 may be a final guess 830, which in some embodiments, may comprise the scenario having the highest probability of being correct. The process of scenario reconciliation by reconciliation module 816 may be also be referred to as "flattening," and this process is discussed in more detail below with reference to FIG. 11.

Figure 9:
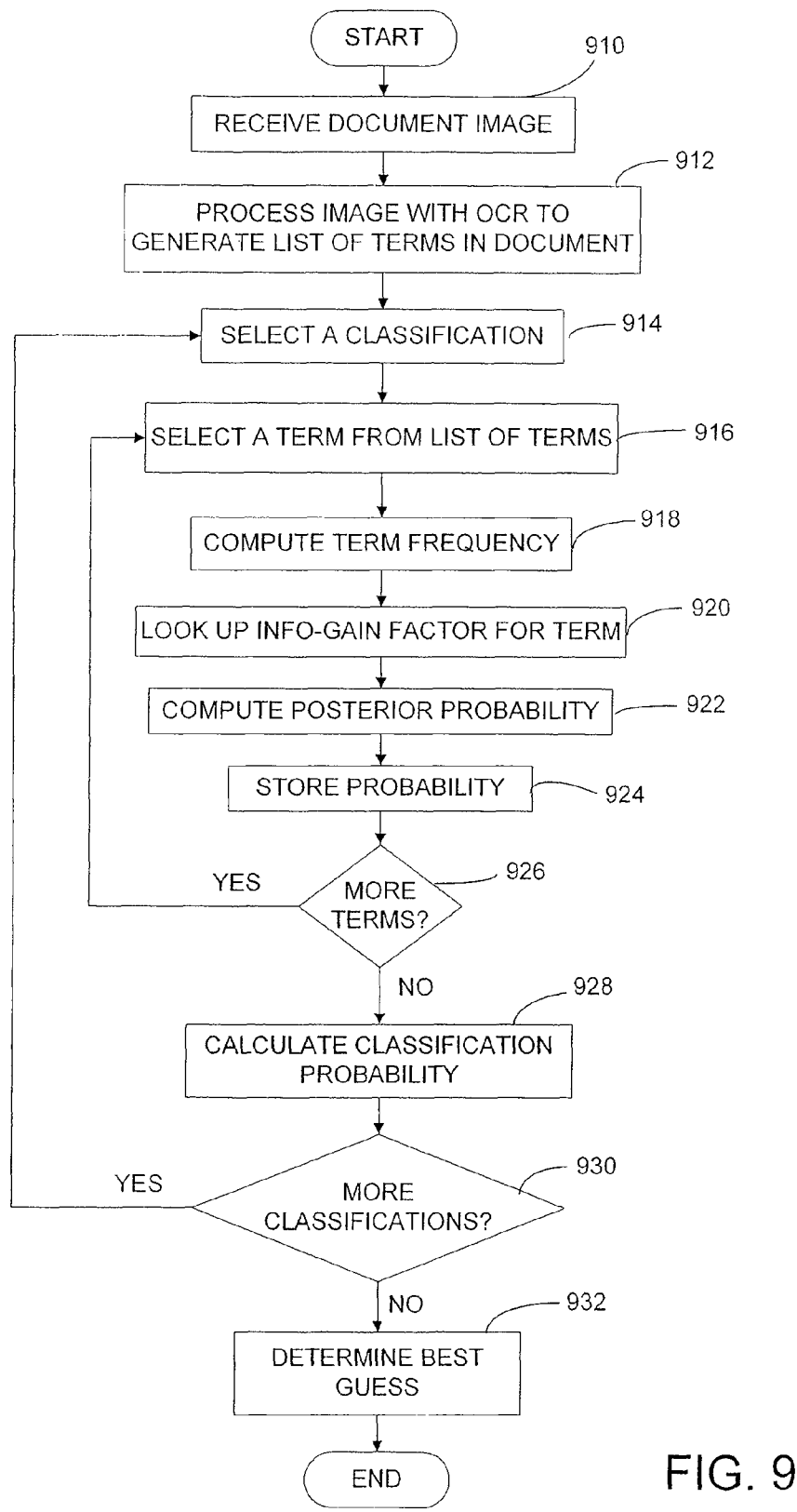
FIG. 9 is a flow diagram of a process for assigning a classification to an electronic document image according to some embodiments of the invention.

According to some embodiments, splitting classification and document classification of a document may proceed according to a process illustrated in FIG. 9. In some embodiments, pages in a document may be processed by assigning a document classification using document classification module 812, followed by assigning a splitting classification using splitting classification module 810. In other embodiments, classification of pages in a document may proceed in any order (e.g., in reverse order) and embodiments are not limited in this respect.

In step 910 of the process illustrated in FIG. 9, an image of a page of a document may be received by processing module 320, and classification may be initiated. The received document image may be parsed in step 912 using an OCR algorithm, as described above, or using any other suitable method for generating a list of terms in the document. In step 914, a classification from a list of classifications may be selected by processing module 320.

For document type classification, document classification module 812 may select a classification such as "Laboratory Results," "Prescription Refill," "Administrative," etc. from a list of predetermined document classification types. In step 916, a first term in the list of terms collected from the document image may be selected by the document classification module, and the frequency of the term in the document may be calculated in step 918. In step 920, document classification module 812 may send a request to vocabulary dictionary 326 for the info-gain factor calculated for the term and classification type, established during training. In step 922, a probability that the page may be assigned the selected classification based on the term may be computed by multiplying the retrieved info-gain factor by an initial probability (a percentage of historical documents that were classified as the selected type). In some embodiments, this probability may be scaled by the term-frequency calculated in step 918. The computed probability may be stored in step 924, and in step 926, it may be determined if there are additional terms in the list of terms which remain to be processed. If there are additional terms, a new term may be selected in step 916, and steps 916-926 may be repeated until all terms in the list of terms have been processed.

After the terms in the list of terms collected from the document have been processed, a probability that the document image may be classified as the selected document classification type may be computed in step 928. In some embodiments, the stored probabilities for each term in the list of terms may be combined to produce a classification type probability value. In step 930, it may be determined if there are additional classification types to consider. If there are additional classification types, a new classification type may be selected in step 914, and steps 914-930 may be repeated until a classification type probability value has been calculated for each classification type. Subsequent to calculating the classification type probability values, the page may be assigned a document classification guess 820 in step 932. In some embodiments, the document classification guess 820 may be the classification type with the highest probability value, and the document classification guess 820 may have an associated confidence level. The confidence level may be a measure of the likelihood that the document has been correctly classified. Upon assigning a classification type to the page, another document image may be processed in a similar manner. In some embodiments, document classification guess 820 may comprise multiple guesses, with each guess having an associated probability related to the likelihood of the individual guesses, whereas in other embodiments the document classification guess 820 may be a single guess.

In some embodiments, splitting classification module 810 may operate according to the process illustrated in FIG. 9, albeit with the modification of some parameters. For example, instead of selecting a document type classification in step 914, one of the four virtual type page-splitting classifications (i.e., 1-1, 1-n, m-n, n,n) may be selected by splitting classification module 810. Additionally, splitting classification module 810 may request info-gain factors from splitting dictionary 324 rather than from vocabulary dictionary 326 as detailed above in connection with document type classification. According to some embodiments, a probability that a document image may be classified as a particular page type may be calculated for each of the four virtual page types in accordance with the process of FIG. 9. The best guess for a page classification may be selected as the page-splitting classification having the highest probability value, and this best guess may be considered as the splitting guess 818. In some embodiments, the splitting guess may have an associated confidence level, which may reflect how likely it is the page has been correctly classified. For example, the confidence level may be a measure of how the calculated probabilities for each of the four virtual type page-splitting classifications differ. In some embodiments, the splitting guess 818 may comprise multiple guesses with associated probabilities related to the likelihood of the individual guesses, whereas in other embodiments the splitting guess 818 may be a single guess, and embodiments of the invention are not limited in this respect.

In some embodiments, trigger terms stored in indexing dictionary 328 may be used by patient identification module 814 to facilitate association of a document image with a particular patient stored in a patient database. As described above, during training of the automated system 300, indexing dictionary may be populated with trigger terms that may be located proximate to key identifying information in a document image.

Figure 10:
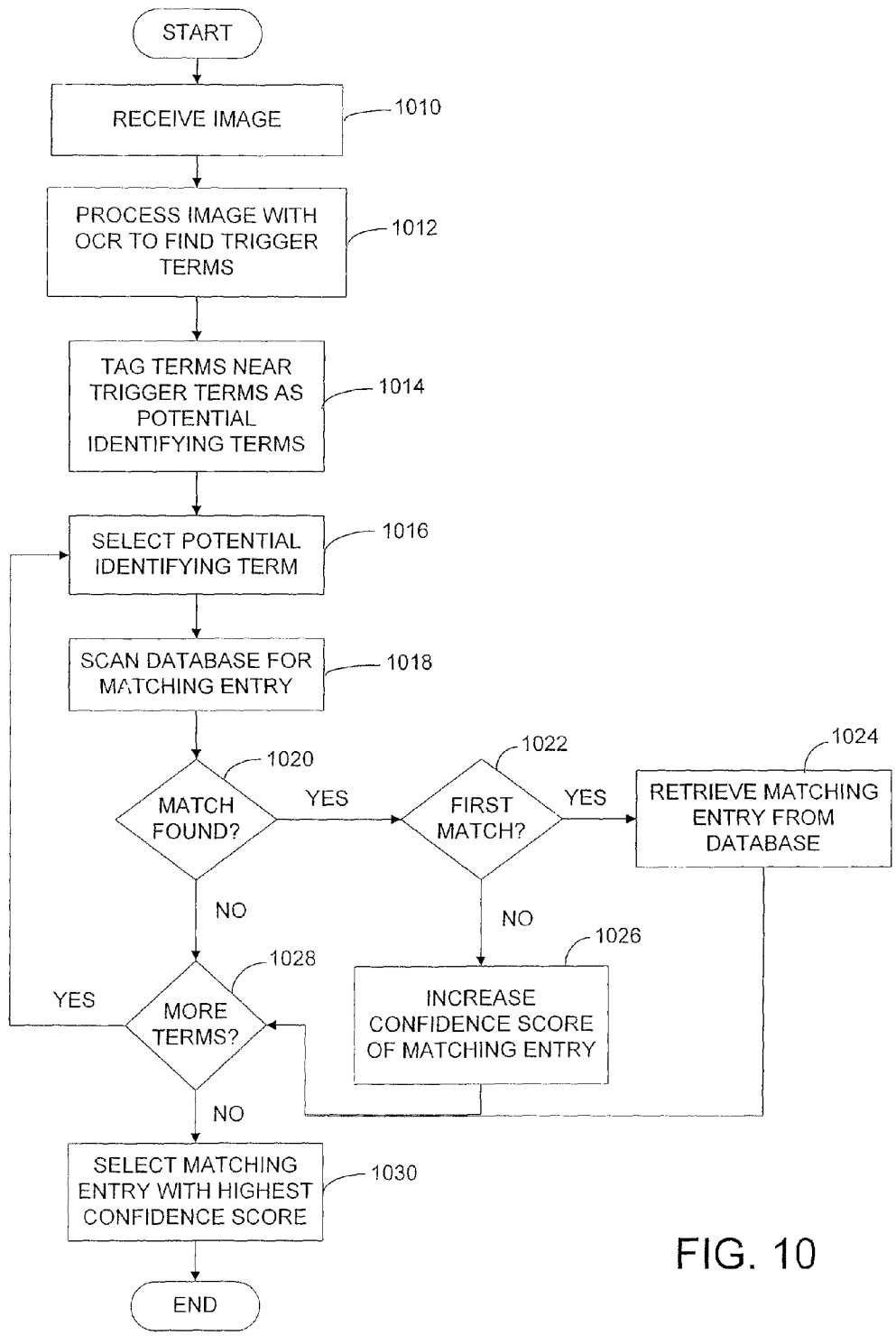
FIG. 10 is a flow diagram of a process for determining identification information from an electronic document image according to some embodiments of the invention.

In some embodiments, the key identifying information may be the identity of a particular patient associated with the document image. A method for searching and retrieving patient identification information from a document image using trigger terms stored in a splitting dictionary is illustrated in FIG. 10. In step 1010, a document image may be received by patient identification module 814, and in step 1012, the image may be processed, for example, by using an OCR algorithm, to identify the location of trigger terms in the document image. In step 1014, terms proximate to the detected trigger terms may be labeled as potential identifying terms, and each of the labeled potential identifying terms may be cross referenced with a data structure stored on a computer (e.g., a patient database comprising patient information). In step 1016, the identification module may select a potential identifying term and scan a database for any matching items in step 1018. For example, the potential identification term, "John Smith," may be located in a document image in step 1014. The identification module may search a data structure, which may be a patient database comprising patient information for all patients seen at a particular clinic, for the term, "John Smith," and the database may be scanned to locate an entry with the name "John Smith" in step 1018. If a matching entry is found in the database in step 1020, it may be determined if the same entry has been previously matched with other potential identification terms located in the document image in step 1022. If the matching entry in the database is a new match, then the entry may be retrieved from the database and stored in a data structure as a potential patient identification in step 1024, and more potential identifying terms may be processed if available. If, however, the matching entry has been previously identified as matching a potential identification term in the document image (i.e., multiple terms have identified a single database entry), an associated confidence score for the matching entry may be increased in step 1026.

After it has been determined in step 1028 that all potential identifying terms for the document image have been processed, the identification module may determine an identification guess 822 for the document image. For example, the identification module may access the data structure storing all potential patient identification entries and their associated confidence scores to determine which entry has the highest associated confidence score. In some embodiments, the entry with the highest associated confidence score may be considered as the identification guess 822.

Similar to the splitting guess 818 and the document classification guess 820, the identification guess 822 may have an associated confidence level, which may reflect the likelihood that the identification guess 822 correctly identifies the patient associated with the document image. In some embodiments, the confidence level associated with the identification guess 822 may be a measure of the difference in confidence scores between the potential patient identification entry with the highest confidence score and all other potential patient identification entries. For example, if multiple entries were found to have identical "highest" confidence scores, one of the entries may be selected randomly as the patient identification guess, and the associated confidence level may be low. However, if only a single matching database entry was found, and the matching entry was found multiple times in a document image, the associated confidence level for the patient identification guess may be high.

Figure 11:
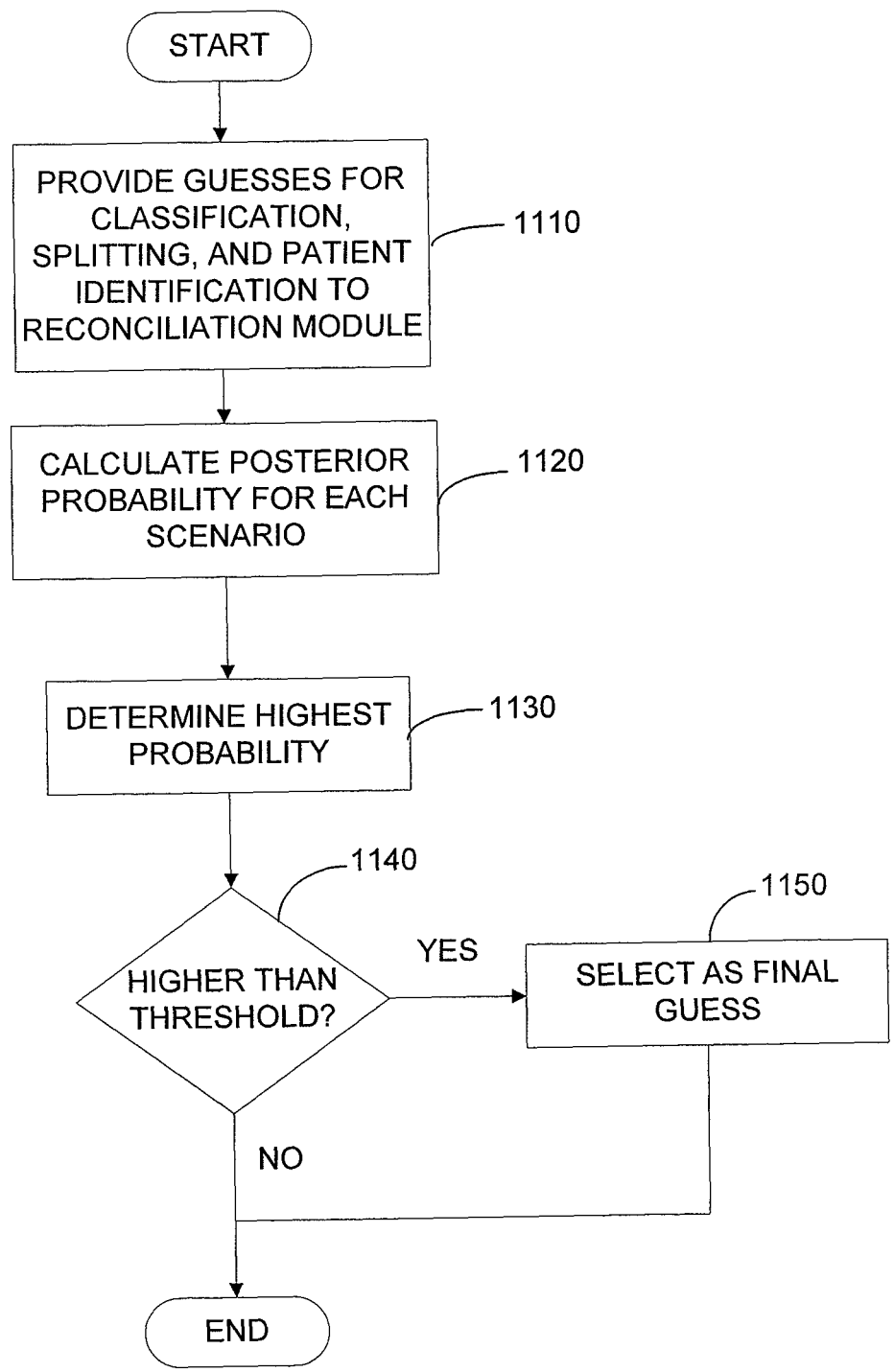
FIG. 11 is a flow diagram of a process for establishing a final classification for an electronic document image according to some embodiments of the invention.

In some embodiments, after automated system 300 has generated guesses for splitting, classifying, and indexing a document (e.g., an incoming fax stream) as described above, the guesses, or sets of guesses, may be combined in reconciliation module 816 into a single "final" guess having an associated confidence level in a procedure called "flattening." For example, if two adjacent pages in a multi-page document are determined to have different document classification types, but the page-splitting module is confident that there's no split between the pages (i.e., both pages have been assigned the same splitting guess with a high confidence level), a conflict may arise. The three independent sets of guesses (i.e., splitting, classifying, and identification) described herein may be consistent, and thus they may reinforce each other. Alternatively, the combination of the three sets of guesses may represent an unlikely scenario, and such combinations may be reduced in probability. In some embodiments, such inconsistent scenarios may be discarded. According to some embodiments, all consistent scenarios based on the calculated guesses may be evaluated by reconciliation module 816, and the scenario having the highest probability may be selected as the final guess if its probability is larger than a predetermined threshold. In some embodiments, the calculated probability for each scenario may be a relative probability, defined as the simple product of the probabilities of a scenario's constituent parts, i.e., probability of splitting guess x probability of consistent document classification. In other embodiments, the probability calculated for each scenario may be an absolute probability, computed by normalizing the relative probabilities. It should be appreciated that any other suitable probability metric may be used, in addition to, or in lieu of relative and absolute probabilities, and embodiments of the invention are not limited in this respect. A flattening process in accordance with some embodiments is shown in FIG. 11.

In step 1110, the guesses for document classification, splitting, and patient identification may be generated and provided as input to reconciliation module 816 as described above. In step 1120, a posterior probability may be calculated for each scenario (i.e., sequence of guesses) according to the following formula:

Posterior $P(scen.\ 1) = \text{old } P(scen.\ 1)/(\text{old } P(scen.\ 1) + \text{old } P(scen.\ 2))$ For example, a first pass may produces guess A with a probability=0.7, and guess B with a probability=0.3. A second pass may produce guess $A_2$ with a probability=0.6, and guess $B_2$ with a probability=0.4, resulting in the probability matrix shown below.

| | |
|---|---|
| A = 0.7 | $A_2$ = 0.6 |
| B = 0.3 | $B_2$ = 0.4 |

In this example, guess A may be consistent with guess $A_2$, and guess B may be consistent with $B_2$ but guess A may not be consistent with $B_2$, and guess B may not be consistent with guess $A_2$. In accordance with some embodiments, posterior probabilities for each guess may be determined from the probability matrix as follows:

Posterior Probability Guess $A = 0.7 \times 0.6/((0.7 \times 0.6) + (0.3 \times 0.4)) = 0.78$ Posterior Probability Guess $B = 0.3 \times 0.4/((0.7 \times 0.6) + (0.3 \times 0.4)) = 0.22$ After the posterior probabilities are computed, the highest probability may be selected in step 1130, and the probability value may be compared to a predetermined threshold value in step 1140. If the probability exceeds the threshold value, then the guess may be determined to be the final guess in step 1150. If however, the highest probability is not greater than the threshold value, the automatic classification of the document may not have achieved a satisfactory level of confidence, thereby requiring the document to be manually classified by a human.

Although some of the examples provided above relate to identifying patient information and searching a patient database, trigger terms may be determined for any situation in which proximate identifying information may be found. For example, if the document image is a mortgage loan application, trigger terms such as "Name," "Annual Salary," "SSN," etc. may be defined, and potential identifying information located proximate to these trigger terms may be used to identify a client from list of all possible clients for a mortgage broker. Additionally, it should be appreciated that any of the image classification methods and apparatus described herein may be use to classify or categorize any types of electronic document images, and embodiments of the invention are not limited by the examples provided herein.

Having thus described several aspects of some embodiments of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of processing an unclassified electronic document image comprising information associated with a healthcare entity, the method comprising:
   converting the image to a textual representation;
   identifying at least one term in the textual representation, wherein the at least one term is represented in training data indicating a degree of association between the at least one term and a plurality of document classifications, wherein the training data includes information about a plurality of terms extracted from a plurality of documents during training;
   determining, with at least one computer processor, for a first document classification of the plurality of document classifications, a first probability that the unclassified electronic document image belongs to the first document classification, wherein determining the first probability comprises for each term of the at least one term, multiplying a value from the training data indicating the degree of association between the term and the first document classification by an initial probability representing a percentage of historical documents that were classified using the first document classification, wherein the initial probability is scaled by a number of times the term appears in the textual representation;
   assigning to the unclassified electronic document image, a document classification to produce a classified electronic document image, wherein the document classification is assigned based, at least in part, on the determined first probability;
   associating a confidence score with the classified electronic document image, wherein the confidence score is determined based, at least in part, on a plurality of classification type probability values each indicating a likelihood that the classified electronic document image is associated with one of the plurality of document classifications; and
   determining that the classified electronic document image was accurately classified if the confidence score exceeds a predetermined threshold value.

2. The method of claim 1, wherein converting the unclassified electronic document image to a textual representation comprises applying an optical character recognition algorithm to the unclassified electronic document image.

3. The method of claim 1, wherein the unclassified electronic document image is a multi-page document, and each page of the multi-page document is assigned a separate document classification.

4. The method of claim 1, wherein the document classification is further based on at least one predetermined document classification category.

5. A method of classifying an image of an unclassified electronic document comprising information associated with a healthcare entity, the method comprising:
   generating, from the image, a data structure comprising at least one term appearing in the image;
   determining a term frequency for the at least one term, wherein the term frequency indicates a number of times that the at least one term appears in the image of the unclassified electronic document;
   determining, for a first document classification of a plurality of document classifications, a first probability that the unclassified electronic document image belongs to the first document classification, wherein determining the first probability comprises for each term of the at least one term, multiplying a value from training data indicating the degree of association between the term and the first document classification by an initial probability representing a percentage of historical documents that were classified using the first document classification, wherein the initial probability is scaled by the term frequency for the term;
   determining, for second first document classification of the plurality of document classifications, a second probability that the unclassified electronic document image belongs to the second document classification, wherein determining the second probability comprises for each term of the at least one term, multiplying a value from training data indicating the degree of association between the term and the second document classification by an initial probability representing a percentage of historical documents that were classified using the second document classification, wherein the initial probability is scaled by the term frequency for the term;
   determining at least one classification probability for the image of the unclassified electronic document, the at least one classification probability determined based, at least in part on, the determined first probability and the determined second probability;
   selecting a classification based, at least in part, on the first probability and the second probability; and
   assigning the classification to the image of the unclassified electronic document to produce a classified electronic document image.

6. The method of claim 5, wherein the data structure is generated by processing the image with at least one optical character recognition algorithm.

7. The method of claim 5, wherein the term frequency is the number of occurrences of the term in the data structure.

8. The method of claim 5, wherein the unclassified electronic document is a facsimile document.

9. The method of claim 5, wherein the healthcare entity is selected from the group consisting of a healthcare provider and a patient of a healthcare provider.

10. The method of claim 5, further comprising, determining a confidence value associated with the classification.

11. The method of claim 10, wherein determining a confidence value comprises determining a difference between the first probability and the second probability.

12. A computer-readable storage medium, encoded with a series of instructions, that when executed on a computer, perform a method of classifying an unclassified electronic document image according to a plurality of document classifications, wherein the unclassified electronic document image comprises information associated with a healthcare entity, the method comprising:

parsing the unclassified electronic document image to identify a first term and a second term in the unclassified electronic document image;

determining, for a first document classification of the plurality of document classifications, a first probability that the unclassified electronic document image belongs to the first document classification, wherein determining the first probability comprises multiplying a value from training data indicating the degree of association between the first term and the first document classification by an initial probability representing a percentage of historical documents that were classified using the first document classification, wherein the initial probability is scaled by a number of times the first term appears in the textual representation;

determining, for the first document classification of the plurality of document classifications, a second probability that the unclassified electronic document image belongs to the first document classification, wherein determining the second probability comprises multiplying a value from training data indicating the degree of association between the second term and the first document classification by an initial probability representing a percentage of historical documents that were classified using the first document classification, wherein the initial probability is scaled by a number of times the second term appears in the textual representation;

determining a combined probability based, at least in part, on the first probability and the second probability; and assigning a classification to the unclassified electronic document image to produce a classified electronic document image, wherein the classification is assigned based, at least in part, on the determined combined probability.

13. The computer-readable medium of claim 12, wherein parsing the unclassified electronic document image comprises processing the unclassified electronic document image using an optical character recognition algorithm.

14. The computer readable medium of claim 12, wherein the unclassified electronic document image is a facsimile document.

15. The computer readable medium of claim 12, wherein determining the first probability comprises accessing at least one data structure, the at least one data structure comprising the first term and the first probability that the at least one term is associated with the at least one of the plurality of classification types.

16. The computer readable medium of claim 15, wherein the at least one data structure is at least one dictionary generated by a training module.

* * * * *